United States Patent [19]

Bamburak

[11] Patent Number: 5,197,092
[45] Date of Patent: Mar. 23, 1993

[54] LOCATION REGISTRATION SYSTEM FOR A PERSONAL COMMUNICATOR SUCH AS A CELLULAR TELEPHONE

[75] Inventor: Michael D. Bamburak, Columbia, Md.

[73] Assignee: McCaw Cellular Communications, Inc., Kirkland, Wash.

[21] Appl. No.: 606,523

[22] Filed: Oct. 31, 1990

[51] Int. Cl.⁵ .................................. H04M 11/00
[52] U.S. Cl. .................................... 379/59; 379/201; 379/211; 379/357
[58] Field of Search .............. 379/57, 58, 60, 355, 379/357, 59, 210-212, 201

[56] References Cited

U.S. PATENT DOCUMENTS

| | | |
|---|---|---|
| 3,588,365 | 6/1971 | McNeilly et al. . |
| 4,086,442 | 4/1978 | Rickard ........................ 379/357 |
| 4,472,606 | 9/1984 | Krolopp et al. . |
| 4,510,493 | 4/1985 | Bux et al. . |
| 4,521,648 | 6/1985 | Hegi . |
| 4,658,416 | 4/1987 | Tanaka ........................ 379/60 |
| 4,680,785 | 7/1987 | Akiyama et al. ............ 379/57 |
| 4,736,409 | 4/1988 | Hasegawa et al. . |
| 4,748,655 | 5/1988 | Thrower et al. ............ 379/57 |
| 4,752,951 | 6/1988 | Konneker ..................... 379/57 |
| 4,763,354 | 8/1988 | Fukushima et al. . |

*Primary Examiner*—Curtis Kuntz
*Assistant Examiner*—Dwayne D. Bost
*Attorney, Agent, or Firm*—Graybeal Jackson Haley & Johnson

[57] ABSTRACT

A personal communicator receiving station, also known as a holster, is capable of receiving a personal communicator unit and communicating therewith. Such receiving stations may be at various locations, including a subscriber's home, office, automobile and other sites. The personal communicator includes the telephone number for call forwarding updating in the central exchange of the personal communications network, while the receiving station includes a call forwarding number. When the receiving station is connected to a landline system, the receiving station obtains the network update number from the personal communicator operatively positioned therein, and communicates the call forwarding number to the network central exchange. In a variation, the personal communicator obtains the call forwarding number from the receiving station and communicates that number to the network through the personal communications system.

11 Claims, 3 Drawing Sheets

LOCATION REGISTRATION SYSTEM FOR A PERSONAL COMMUNICATOR SUCH AS A CELLULAR TELEPHONE

TECHNICAL FIELD

This invention relates generally to the art of cellular telephone communication systems and more particularly concerns a system for identifying, i.e. registering, the location of a personal communicator, such as a cellular telephone, within a communications network.

BACKGROUND OF THE INVENTION

In any communications network, it is important to know the physical location of each subscriber within that network. With respect to conventional landline, public switched telephone networks (PSTN), the location of each subscriber in the network is known because the location of the telephone instrument assigned to each subscriber is substantially fixed and thus is known, due to the hard-wire nature of the PSTN system. Each telephone instrument is connected by wires (telephone line) to a central switching facility and is assigned a particular number. The ability of the network to contact the subscriber is limited to the terminus location of the connecting telephone line.

Cellular communications technology provided an alternative to the conventional landline fixed communication network and introduced a widely accessible and practical mobile communications concept. Within a cellular network, each cellular telephone has an assigned number, and an ability to communicate with all telephones within the cellular area, including landline telephones. With the development of cellular networks, however, the need for location supervision of the individual cellular units in a particular network became necessary. Currently, location registration of cellular units is accomplished in one of two ways, as specified in EIA/TIA-553, which is the mobile station-land station compatibility specification for the United States cellular system. In the first location registration system, which is generally referred to as periodic registration, automatic reporting at specific times is provided by the subscriber cellular unit to the central exchange of the cellular network. The subscriber's location is identified to the central exchange as a particular cell site within the overall system. In operation of the first system, the central exchange regularly sends a "current time" value, referred to as REGID, to all mobile cellular units. A stored "wake-up time", referred to as NXTREG, is set in the mobile unit after the occurrence of certain specified events, such as registration, origination access or page response. The wake-up time is set by adding a particular number of steps, referred to as REGINCR, to the current time value (REGID). The mobile unit checks the current time value (REGID) against the wake-up time (NXTREG). In this system mobile cellular units can be required to register at regular intervals over an approximate range from five minutes to five hours.

In the second system, referred to as forced registration, reporting is made by the subscriber unit whenever it crosses a network-defined boundary such as a different system identification (SID) area, a different paging area or other defined boundary. At these crossing points, a transmission is provided to the central exchange identifying the change in location of the subscriber unit.

While either or both of these systems provide location information for the subscriber unit, it is well known that their effectiveness is somewhat limited, because the resulting location of the subscriber unit is specific only to the particular serving cell site within the system. As the cellular industry matures, and smaller and smaller cell sizes become more prevalent, location identification will become more precise, but such increased preciseness will still not be completely satisfactory. Preferably, a cellular network should be able to direct calls to and from a subscriber unit wherever that subscriber unit is located, by any convenient means, including, where appropriate, communication by a landline telephone network. A significant increase in the level of preciseness of identifying the location of a subscriber unit in a cellular network is thus needed.

The network should be able to direct calls to and from a subscriber not only on a location basis, but also be able to deliver a call to the proper terminal. For instance, at a location where both the cellular telephone itself and/or a conventional landline telephone are located, it is important to know to which instrument a particular call should be directed. Additional sophistication may be desired even when the system knows the subscriber's location. For instance, a power-down communication from the cellular unit which is interpreted to mean that communication should occur through the landline network, would not be satisfactory in the situation where the subscriber does not wish to be disturbed.

Accordingly, an apparatus is needed which can be conveniently used with existing cellular networks to provide updated location registration for each subscriber unit within the system, as soon as and as frequently as a change in location of the unit occurs.

DISCLOSURE OF THE INVENTION

Accordingly, the present invention is a location registration system for personal communicators within a personal communications network. The system includes a personal communicator, such as a cellular telephone, which is part of a personal communications network which has the capability of maintaining a call forwarding number for the personal communicator, wherein the personal communicator includes information for contact with the personal communications network. The system also includes at least one receiving station positioned at a selected location, for receiving the personal communicator, wherein the receiving station includes a call forwarding number. The system further includes means in the personal communicator and the receiving station for communicating with each other, and means for communicating the call forwarding number to the personal communications network when the personal communicator is operatively positioned in the receiving station.

BEST MODE FOR CARRYING OUT THE INVENTION

The present invention is a peripheral device for use with a personal communicator, such as a cellular telephone or similar device. The peripheral device, referred to hereinafter as a receiving station, is capable of two-way communication with a personal communicator which is placed therein. The combination of the receiving station apparatus and the personal communicator provides information to a central exchange in the personal communications network as to the location of the personal communicator. Call forwarding is provided for that specific location, either through the landline system to a PSTN instrument at that location, or through the personal communications network. In a complete system arrangement, receiving stations will be located at a number of different physical locations, including residences, offices, automobiles (mobile), hotels, airports, etc.

When the subscriber, carrying his personal communicator, arrives at a particular location and desires telephone calls to be directed to him at that location, his personal communicator is placed in the receiving station. Communication is established between the receiving station and the personal communicator, and the central exchange in the personal communications network thereafter directs calls for the subscriber to the location specified by the receiving station, through call forwarding procedures, as explained in more detail below. Hence, the peripheral device in effect acts as a "holster" for the personal communicator at various specific locations.

Figure 1:
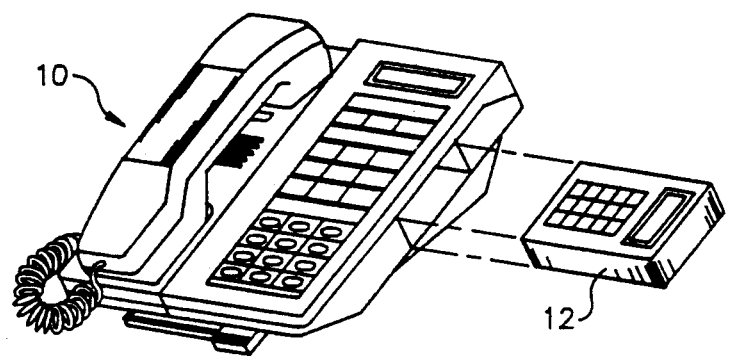
FIG. 1 is a schematic view of a desk phone type receiving station of the present invention.

Referring now to FIG. 1, the receiving station, shown generally at 10, is configured to conveniently receive a personal communicator 12, which otherwise can be carried on or about the person of the user. Typically, upon arrival at the location of a receiving station, the user will simply place the personal communicator 12 on or in the station 10. This will occur wherever the subscriber is located, such as an office, or at his residence or even in his car. Each receiving station 10 includes a receiving switch (not shown) which is actuated when the personal communicator 12 is placed therein. Each receiving station 10 has a memory which includes a call forwarding number identified specifically with that receiving station. The actuation of the switch initiates the operation of the receiving station to begin the location updating or registration process within the overall communications system of which the personal communicator 12 is a part.

Once the receiving station has been activated, it determines the operational status of the personal communicator and, if the personal communicator is in an "off" condition, the receiving station will change the condition of the personal communicator to "on".

Figure 3:
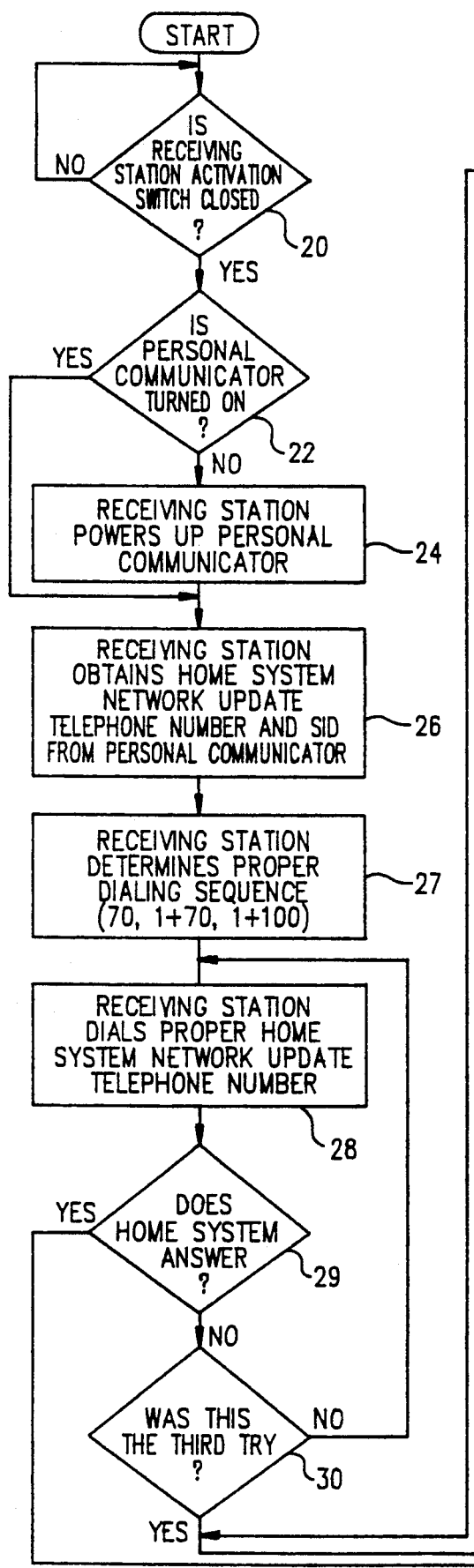
FIG. 3 is a flow chart showing the communication between a personal communicator, such as a cellular telephone, a receiving station and the central exchange of a personal communications network.
Figure 3:
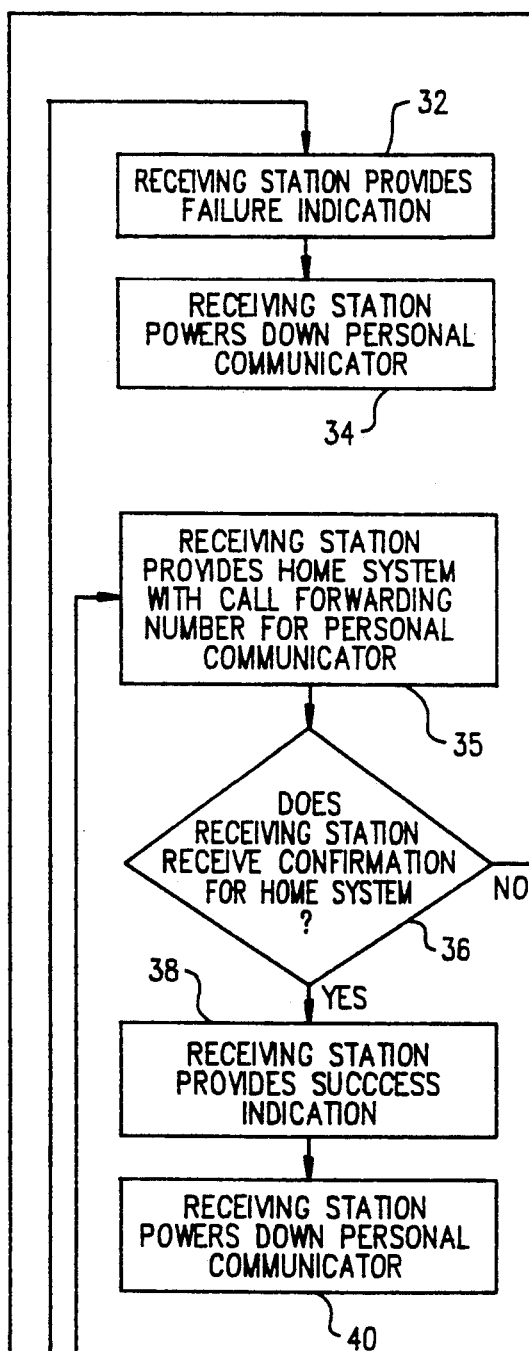

The overall system of the present invention makes use of the existing landline communications network. FIG. 3 shows the detailed flow of communication between the receiving station 10, the personal communicator 12 and the central exchange in the personal communications network. When the personal communicator 12 is placed in the receiving station, there is first a verification, shown as block 20, that the receiving switch at the receiving station has been closed. In the next step in the process, block 22, a verification is made by the receiving station that the personal communicator has in fact been turned on. If not, the receiving station 10 turns on (powers up) the personal communicator 12, as shown at block 24. Once the personal communicator is on, the receiving station, as shown at block 26, then obtains the particular telephone number at the personal communications network's (home system network) central exchange which has been assigned for receiving updated location information and the SID number, which are both stored in memory in the personal communicator.

With this information, the receiving station determines the proper dialing sequence to contact the central exchange, as shown at block 27. This is done by a conventional "smart auto-dialer" system in the receiving station. The receiving station is connected into the conventional landline telephone network by means of an appropriate connector, such as an RJ11 telephone jack. When a receiving station is installed at a particular physical location, it is programmed with one list of SID numbers which require seven-digit dialing to reach the central exchange and another list of SID numbers which require long distance one-plus-seven digit dialing. Any SID number of a particular personal communicator which does not appear on either list then defaults to long distance one-plus-ten digit dialing.

The SID number from the personal communicator is compared to the above-described lists to determine the proper dialing sequence for that personal communicator, as shown at block 27; the receiving station then dials the update number via the conventional landline system, as shown in block 28. If the central exchange in the personal communications network ("home system" in block 29) does not answer, the number is dialed again. In the embodiment shown, the number is dialed a total of three times, as shown in block 30. The number of dialing attempts, of course, could be readily varied.

If there is still no answer on the third try, the receiving station provides a failure indication to the user, as shown in block 32, and then turns off the personal communicator, as shown in block 34. If, however, a connection is made with the central exchange, the receiving station provides the central exchange with the call forwarding number in the receiving station for the personal communicator, as shown in block 35.

As shown by block 36, a confirmation of receipt of the call forwarding information by the central exchange is provided and displayed at the receiving station. If the call forwarding information is not received by the central exchange, the receiving station provides a failure indication and turns off the personal communicator. The confirmation indication, the result of a successful transmission, is shown at block 38; thereafter, the personal communicator is turned off, as shown by block 40.

The call forwarding number, indicating a precise location or registration point, for the personal communicator is now in the central exchange of the home system personal communications network, and any call made to the subscriber will be directed to the call forwarding number. In the system of FIG. 3, that call will be placed through the conventional landline system to the receiving station.

Figure 4:
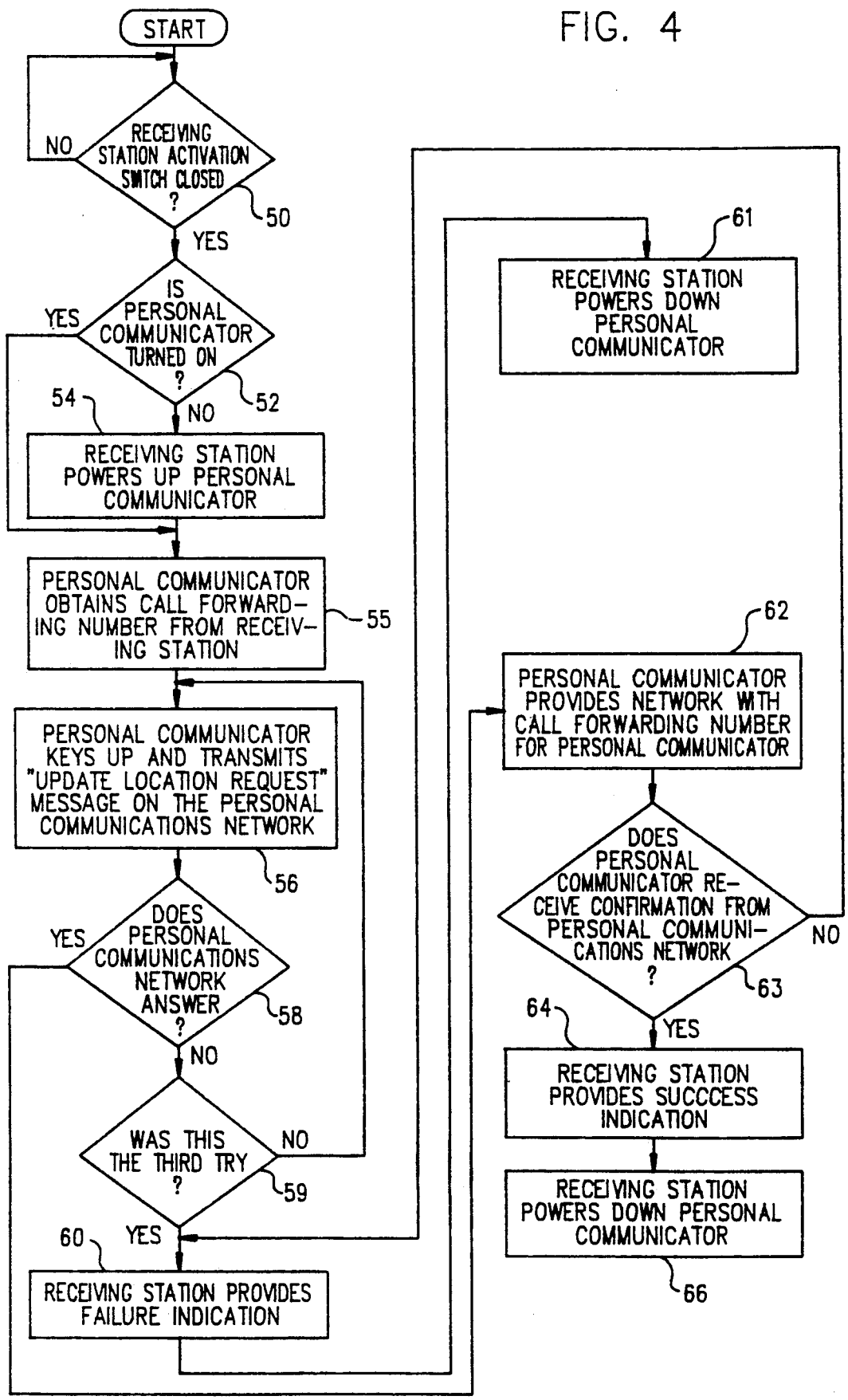
FIG. 4 is a variation of FIG. 3, showing communication between a personal communicator, a receiving station and the central exchange of a personal communications network.

FIG. 4 illustrates a variation of the present invention in which the location updating or registration for the personal communicator is accomplished via the personal communications network; i.e. the communication with the central exchange is via the personal communicator itself instead of the landline network. Referring to FIG. 4, when the personal communicator is positioned in the receiving station, there is first a verification that the receiving switch in the receiving station has been closed, as shown by block 50. If a verification occurs, then there is a determination of whether or not the personal communicator is on, as shown by block 52. If the personal communicator is not on, the receiving station turns on the personal communicator, as shown at block 54.

At this point, the personal communicator obtains the call forwarding number of the receiving station, which is stored in its memory, as shown at block 55.

The personal communicator then keys up and transmits to the central exchange a request to update the location of the personal communicator (with the call forwarding number of the receiving station) within the personal communications network, as shown at block 56. Next, the central exchange will provide a verification of successful communication, as shown by block 58; if the communication is not completed after a selected number of attempts, as shown by block 59, the receiving station provides a failure indication, as shown by block 60, and the receiving station turns off the personal communicator, as shown by block 61.

If communication is established with the central exchange, then the personal communicator provides the central exchange with the call forwarding number obtained from the receiving station, as shown in block 62. The central exchange determines the "home system" for the particular personal communicator, and the call forwarding number is placed in the subscriber's calling file. At this point, there is a confirmation sent from the central exchange to the personal communicator and a success indication is provided, as shown in blocks 63 and 64. If confirmation is not received, after several attempts, then the receiving station provides a failure indication and turns off the personal communicator, as shown in blocks 60 and 61. If confirmation is received, the receiving station provides an indication of success as shown by block 64 and thereafter turns off the personal communicator, shown in block 66.

Hence, the personal communications network has a call forwarding number for the subscriber at every receiving station location. This call forwarding number will be routed either through the landline system or through the personal communications network, depending upon the particular receiving station, and whether or not it is connected to a landline network.

Figure 2:
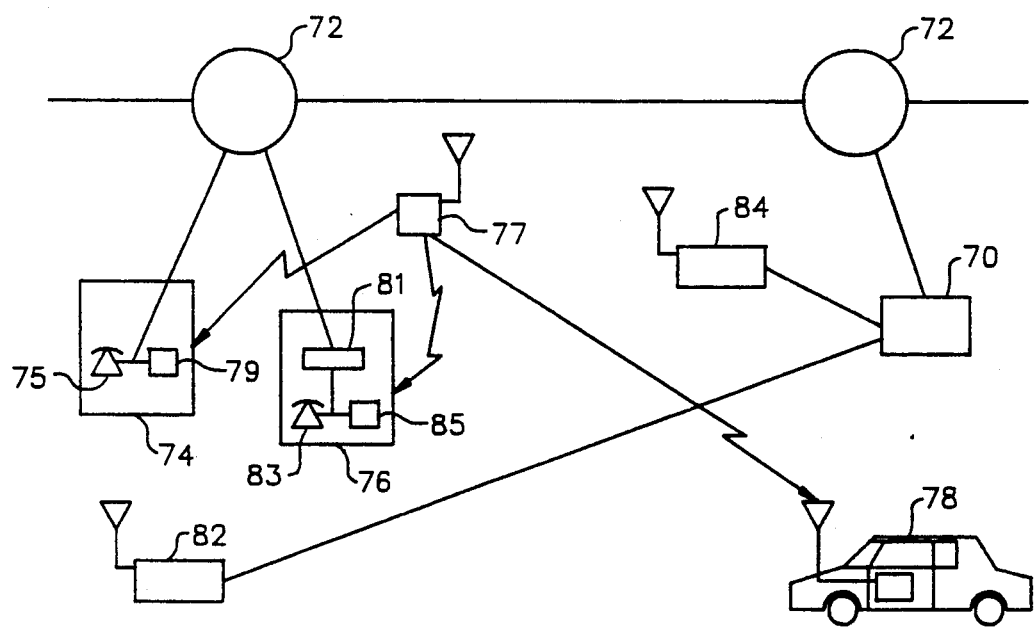
FIG. 2 is a diagram showing a network of possible locations for receiving stations of the present invention.

FIG. 2 shows a simplified version of the implementation of the present invention in a network. The system comprises a network central exchange 70 for the personal communications network and a central office 72 for the landline communication system. The receiving stations may be positioned, for example, at a residence 74, an office 76 or in a mobile vehicle, such as an automobile 78. In receiving station 74, a conventional landline phone 75 is illustrated with its a holder element 79, while office 76 includes a switchboard 81, a phone 83 and holder 85. Base stations 82 and 84 are associated with the central exchange 70. Communication occurs between the personal communicator 77 and the receiving stations at any one of those locations as explained above, as the personal communicator 77 is moved, and then, in turn between the receiving station and the central exchange, or the personal communicator and the central exchange.

The receiving stations will typically include an internal power supply with a battery backup and may in addition include a charger for the personal communicator.

Hence, in the system described herein, using a plurality of receiving stations or holsters, call forwarding is associated with a particular subscriber, as opposed to a particular place. Hence, identification of subscriber location can be much more precise, if receiving stations are well distributed within the network area.

Although a preferred embodiment of the invention has been disclosed for purposes of illustration, it should be understood that various changes, modifications and substitutions may be incorporated in such embodiment without departing from the spirit of the invention as defined by the claims which follow:

What is claimed is:

1. A location registration system for personal communicators within a personal communications network, comprising:

a personal communicator unit, which is part of a personal communications network, the personal communicator unit being capable of direct, two-way communication with the personal communications network and with other personal communicator units within the personal communications network via said network, the personal communications network having the capability of maintaining a call forwarding number for the personal communicator, wherein the personal communicator includes information for contact with the personal communications network;

at least one receiving station positioned at a selected location, for receiving the personal communicator, wherein the receiving station includes a particular call forwarding number associated therewith;

means in the personal communicator and the receiving station for two-way communication with each other; and means for automatically communicating the particular call forwarding number to the personal communications network which will in operation maintain the particular call forwarding number for communication with said personal communicator, in response to said personal communicator being operatively positioned in said receiving station.

2. A system of claim 1, including a plurality of receiving stations, each positioned at a selected location.

3. A system of claim 1, wherein the receiving station includes means for actuating itself when a personal communicator is operatively positioned therein.

4. A system of claim 3, including means in the receiving station for activating and deactivating the personal communicator, when the personal communicator is operatively positioned therein.

5. A system of claim 1, wherein the personal communicator is a cellular telephone, and the personal communications network is a cellular communications network.

6. A system of claim 5, wherein the particular call forwarding number is communicated to the cellular communications network through cellular communication.

7. A system of claim 5, wherein the receiving station is connected to a landline telephone network and wherein the receiving station includes means for obtaining from the personal communicator said contact information for the personal communications network, wherein communication between the receiving station and the cellular communications network and communication between the cellular telephone and the cellular communications network is carried out via landlines.

8. A system of claim 7, wherein said receiving station includes an automatic means for dialing the personal communications network.

9. A system of claim 7, wherein the contact information includes a call forwarding update telephone number for the personal communications network.

10. A system of claim 7, wherein the receiving station includes means for communicating the call forwarding number to the personal communications network following telephone connection therewith.

11. A system of claim 10, wherein the receiving station includes means for indicating the success or failure of telephone connection with the personal communications network and of communicating the call forwarding number thereto.

* * * * *